Figure 1:
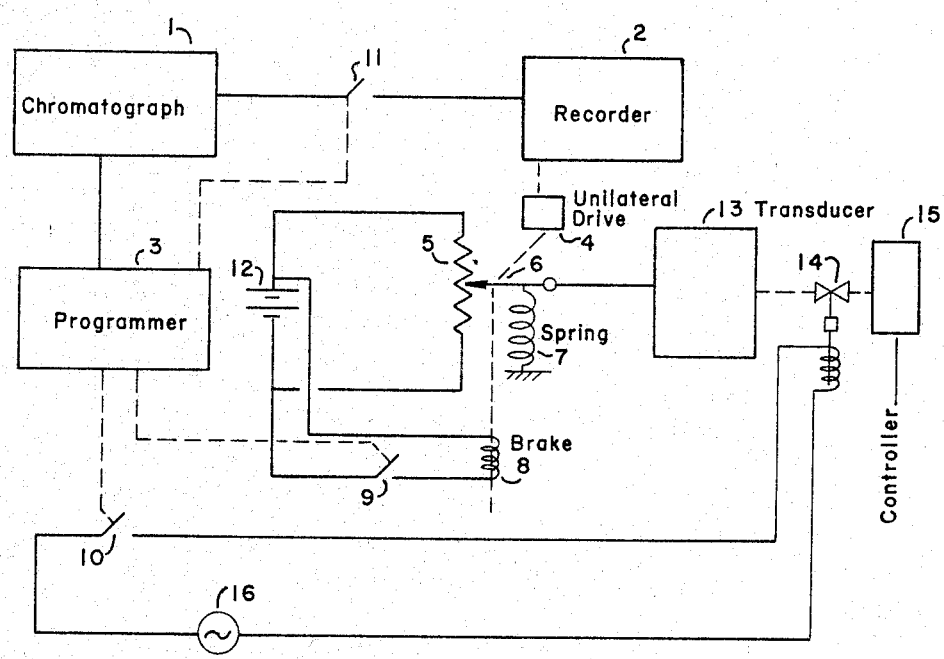

Oct. 4, 1966     M. O. BIRD     3,276,242
TREND RECORDING APPARATUS FOR ANALYZERS
Filed Jan. 2, 1964     3 Sheets-Sheet 1

INVENTOR.
Marliss O. Bird
BY
*C. Ray Holbrook Jr.*
ATTORNEY

Oct. 4, 1966   M. O. BIRD   3,276,242
TREND RECORDING APPARATUS FOR ANALYZERS
Filed Jan. 2, 1964   3 Sheets-Sheet 3

INVENTOR.
Marliss O. Bird
BY
*C. Ray Holbrook Jr.*
ATTORNEY

3,276,242
TREND RECORDING APPARATUS FOR ANALYZERS

Marliss O. Bird, Texas City, Tex., assignor to Monsanto Company, St. Louis, Mo., a corporation of Delaware
Filed Jan. 2, 1964, Ser. No. 335,076
8 Claims. (Cl. 73—23.1)

This invention relates to signal recording systems wherein a peak or maximum value of a signal is recorded as a continuous record of changes or trends in signal magnitudes. More particular, this invention relates to apparatus for retaining, or remembering and transmitting the maximum amplitudes or peak of cyclic signals obtained from an analyzer such as a chromatograph.

Most analytical instruments, for example, gas chromatographs, are inherently data sampling devices. In gas chromatography, a quantity of sample is periodically introduced into a chromatographic column and a carrier gas is passed through the column. The sample components are separated in the column and eluted therefrom one by one, each at a characteristic elapsed time. The effluent from the column passes through a retaining, or remembering and transmitting unit such as a thermal conductivity bridge and each injection of sample generates a train of signal peaks representing the separate components of the sample. Each peak magnitude provides a quantitative measure of the amount of a particular component in the sample. The result of each sample of material being analyzed is usually recorded in the form of a chart which is a record of each resolved component of the sample. To fully utilize the capability of various analyzers as instruments to assist in the control of chemical processes, the concentrations of key components in the process stream must be used to adjust process conditions. Conversion of these concentrations of key components into signals applicable to control devices for adjusting process condition requires automatic instrumentation which can sense component peak values produced by the analyzers. Various devices, means, and methods have been used in the past to sense and transmit the concentration of such a key component, but heretofore none of these systems has combined simplicity, ease of maintenance, and reliability.

Devices known as peak readers, trend recorders, and memory read-out systems are available for analyzer instruments from several sources. All of these systems attempt to read the "maximum" or "peak height" value for a key component from a process analyzer such as a gas chromatograph, record this peak value and then transmit it to a control system which will adjust process conditions if the concentration of the key component is above or below a certain predetermined value. These systems range from mechanical devices to completely transistorized electronic systems, but all have proved inadequate for this complex job because of unreliability, high cost, and high maintenance and complexity which requires special training of personnel.

One such mechanical device transfers a peak value by a switching apparatus that operates when the process gas analyzer recorder starts driving down scale after having driven up scale to reach a peak; that is, whenever there is a change from positive to negative slope in the signal peak. At times, this change in slope may be a false peak; therefore, large errors are possible with this device.

Peak readers, using servo motors, have the disadvantage of being very large with many moving parts which require frequent servicing. Obviously, these devices are very expensive to purchase, install and maintain. Those which transduce the electrical signal to a pneumatic signal before reading the peak cannot readily supply peak signals for use in electrical control instruments.

A simple and inexpensive electro-mechanical peak picker of superior design has now been discovered for producing accurate and reproducible results with process analyzers which produce an output signal in the form of a cyclic train of signal peaks.

An object, therefore, of the present invention is to provide a trend recording system for use with an analyzer which produces an output signal in the form of a cyclical train of signal peaks. Another object is to provide an apparatus in a trend recording system for sensing the maximum value of signals in the form of a cyclical train of signal peaks. Another object of this invention is to provide an apparatus for sensing the maximum value of signals in the form of a cyclical train of signal peaks without sensing false peaks. Another object of this invention is to provide a trend recording system for either recording the maximum values of signals in the form of a cyclical train of signal peaks or to utilize the maximum values obtained in a process control system. These and other objects of the invention will become apparent to those skilled in the art by the following description, drawings, and appended claims.

According to the invention, there is provided a signal reading system comprising an analyzer-means for producing in accordance with the cyclical introduction of sample, a cyclical train of signal peaks in the form of mechanical cyclical angular motion proportional to the amplitude of said signal peaks, electrical variable resistance means having a source of potential connected thereto whereby voltage signals proportional to the amplitude of said signal peaks are produced, said voltage signals being produced in accordance with the positioning of the movable arm of said variable resistance, unilateral drive means mechanically coupling said cyclical angular motion produced by said analyzer means to said movable arm of said variable resistance to move said movable arm in only one direction, quick release brake means for holding said movable arm of said variable resistance in cyclical stationary positions, programming means for synchronizing the activating and releasing of said brake means with said angular motion produced by said analyzer means so that said brake means is activated during the time said angular motion is produced, control means operated by said programming means for activating and releasing said brake means, transducer means responsive to said voltage signal from said variable resistance for converting the same into an output signal, means for returning said movable arm of said variable to a zero reading, and means for holding said output signal until the same has been recorded or until the same variable is read again. A particular feature of the present invention is the apparatus for sensing the maximum values of the cyclical train of signal peaks without recording the false peaks.

Figure 2:
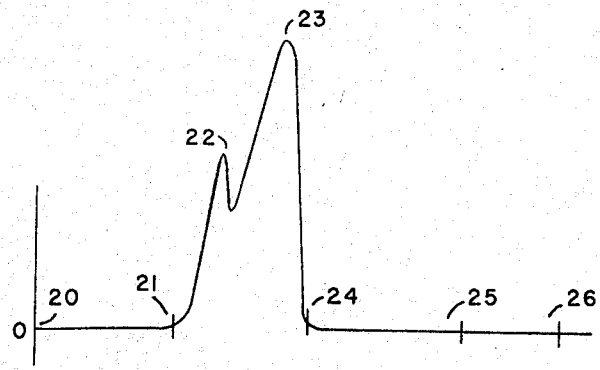
Figure 3:
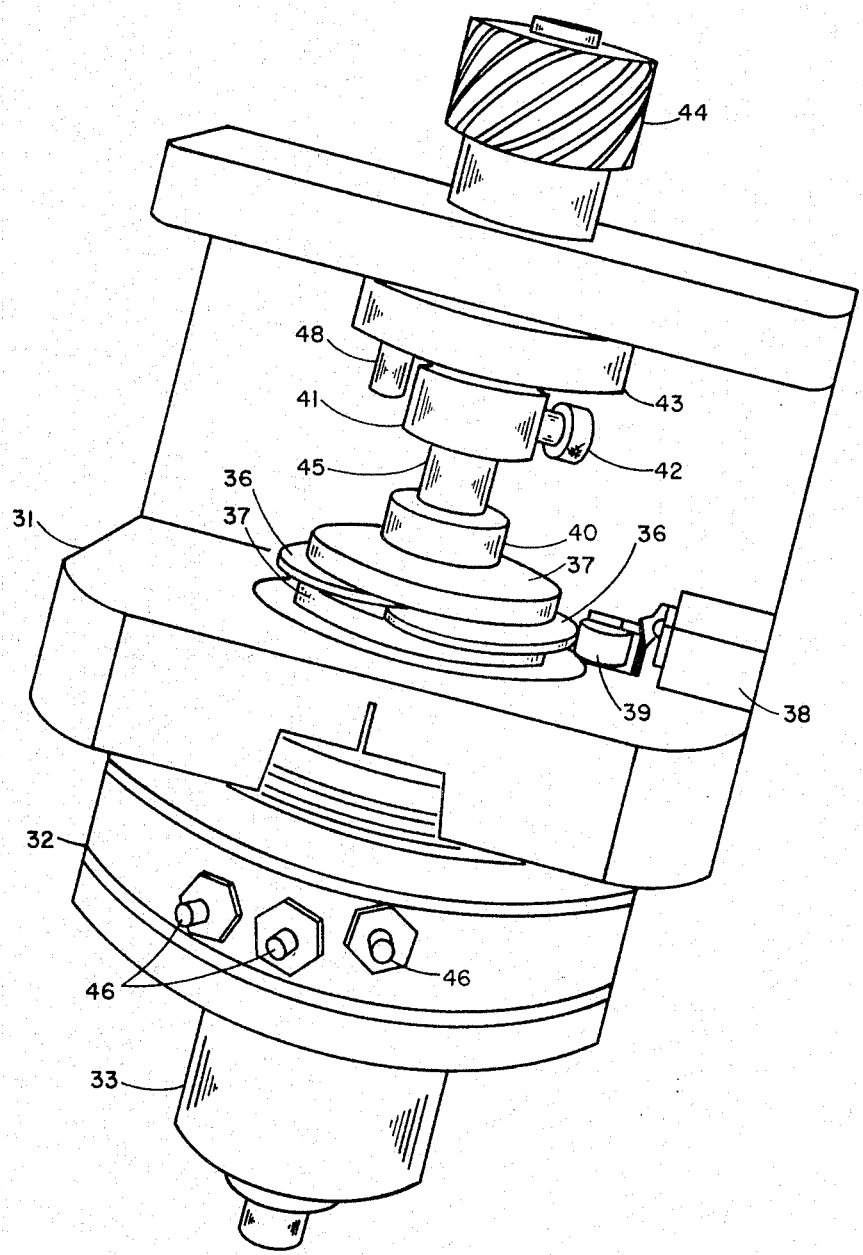
Figure 4:
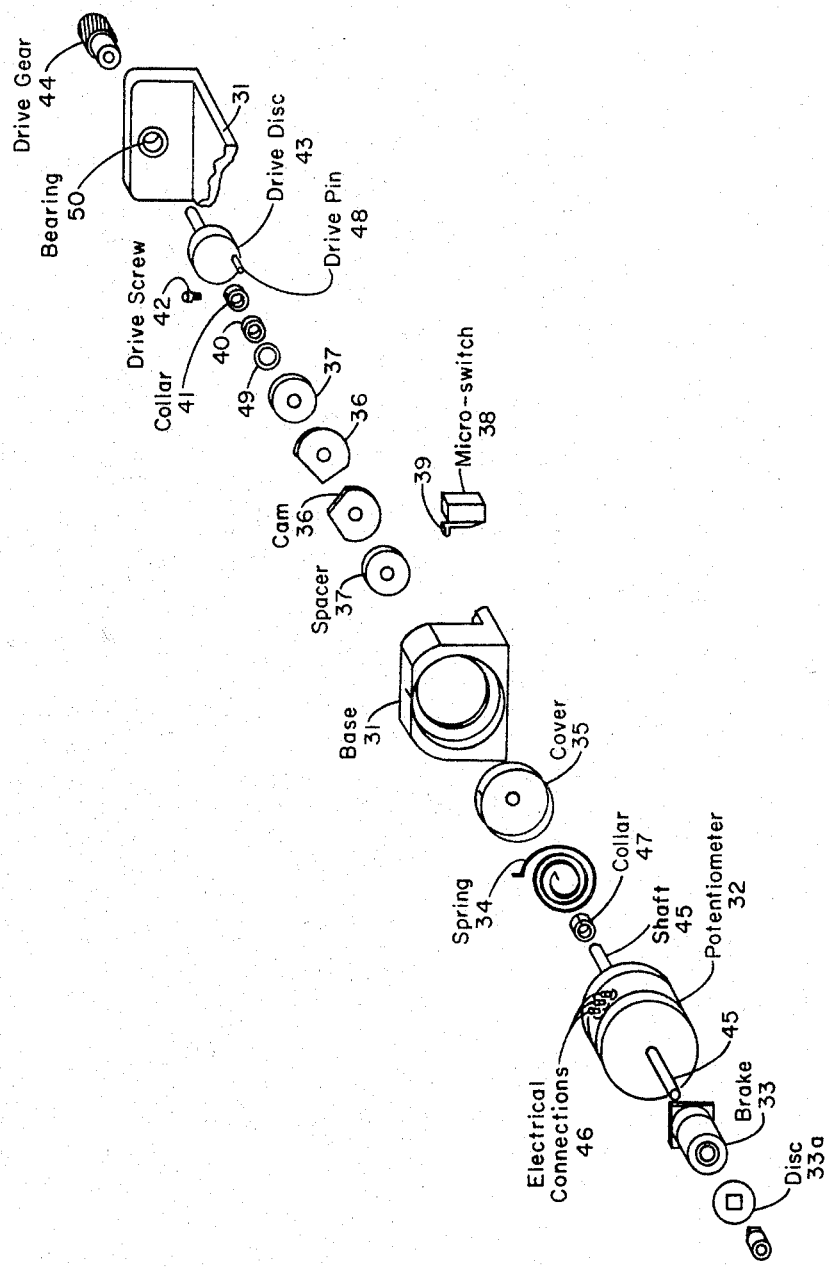

The attached drawings depict the apparatus of the present invention, but are not to be construed as limiting the invention in any manner whatsoever. FIGURE 1 shows a functional diagram of the read-out system of the invention. FIGURE 2 shows a chart of the recorded component values from the process. FIGURE 3 is the assembled peak reader apparatus of this invention ready for use in the read-out system of FIGURE 1. FIGURE 4 is an exploded view of the peak reader apparatus showing each of the parts.

Referring now to FIGURE 1, gas chromatograph 1 analyzes the process stream for the component values which the apparatus of this invention records and transfers. Analyzer recorder 2 takes the signal from gas chromatograph 1 and transfers it through the peak picker apparatus and finally to a pneumatic trend recorder-controller 15. The operation of the read-out system is controlled by programmer 3 which opens and closes switches 9, 10 and 11. The peak picker apparatus consists of unilateral drive 4, potentiometer 5 with slider 6, return spring 7 and electromagnetic brake 8. A D.C. source 12 is utilized by electromagnetic brake 8 and potentiometer 5. At the proper time, the electrical value trapped on potentiometer 5 is transferred through electric to air transducer 13 and solenoid valve 14 to recorder-controller 15. An A.C. or D.C. power source 16 is provided to operate solenoid valve 14.

Referring now to FIGURE 2 for a sequential operation of the read-out system in FIGURE 1, the cycle begins at point 20 with switches 9, 10 and 11 open, electromagnetic brake 8 off, solenoid valve 14 closed, slider 6 on potentiometer 5 at the zero reading. At point 21, a signal from programmer 3 closes switches 9 and 11 which energizes electromagnetic brake 8 and any signal from the gas chromatograph 1 will be transferred to analyzer recorder 2 and will begin to drive slider 6 on potentiometer 5 up scale by means of unilateral drive 4. Point 22 of the recorder chart is a false peak. In the apparatus of this invention, slider 6 stops, the value is trapped by electromagnetic brake 8 but slider 6 does not drive down scale on the succeeding trend decrease because of the mechanical unilateral drive 4 nor is the peak value transferred through transducer 13 to recorder-controller 15. At point 23, which in this example is the true peak for the component analyzed in gas chromatograph 1, slider 6 of potentiometer 5 is held at the peak value by electromagnetic brake 8. However, there is still no transfer of the peak value at this time. At point 24, a signal from programmer 3 opens switch 11 and closes switch 10 which opens solenoid valve 14. The electrical value trapped in potentiometer 5 and converted to a porportional pneumatic value by transducer 13 is then transferred through solenoid valve 14 to recorder-controller 15. At point 25, which is a predetermined period of time after point 24, a signal from programmer 3 opens switch 10 which closes solenoid valve 14 and the peak air signal transferred from transducer 13 into recorder-controller 15 is trapped in recorder-controller 15. At point 26, after another predetermined period of time past point 25, a signal from programmer 3 opens switch 9 which releases electromagnetic brake 8 and return spring 7 positions slider 6 of potentiometer 5 to the zero position of analyzer recorder 2.

In the operation of the read-out system shown in FIGURE 1, the programmer may be replaced by a separate timer and delay system, but it is preferred to use a programming apparatus. It is also possible within the broad scope of this invention to replace the potentiometer and transducer in the peak reading apparatus with a motion to air transducer which can then transfer the signal straight from the unilateral drive to the recorder-controller.

In the peak picker apparatus, as shown in FIGURE 3 and in more detail in FIGURE 4, base 31 may be constructed of any convenient, easily-machinable metal such as aluminum, steel or bronze. A one-turn electrical potentiometer 32 without stops, fits into the machined-out section on the outside of base 31 so that potentiometer shaft 45 extends well into the center section of base 31. Electromagnetic brake 33 including brake disc 33a fits over potentiometer shaft 45 and is fastened to potentiometer 32. A steel spring 34 to return potentiometer 32 to a zero reading after each peak measurement is attached to base 31 through a slotted dust cover 35 and to potentiometer shaft 45 by means of slotted set collar 47. Fastened to potentiometer shaft 45 and held tightly against the inside of slotted set collar 47 by lock collar 40 and compression washer 49 are circular cam spacers 37 and adjustable alarm cams 36. From one to four micro-switches 38 may be mounted on base 31 in positions so that actuating arms 39 of micro-switches 38 ride on cams 36 and alarms may be signaled depending on the position of cams 36. At the end of potentiometer shaft 45 is located drive collar 41 with set-screw drive arm 42. Drive disc 43 is also located in base 31 but is free to rotate in bearing 50. Drive gear 44 is attached to the shaft of drive disc 43 on the outside of base 31 and rotates with drive disc 43.

Potentiometer 32 is driven up scale by angular rotation of potentiometer shaft 45 from a gas analyzer recorder (not shown) which turns drive gear 44 and drive disc 43. Drive pin 48 placed off-center contacts set-screw drive arm 42 and thereby rotates potentiometer shaft 45 to the peak rotation as the signal from the gas analyzer drives the recorder upscale. Electromagnetic brake 33 holds the peak angular position of potentiometer shaft 45 while drive gear 44, drive disc 43, and drive pin 48 return to zero with the recorder. This peak reading on potentiometer 32 is transferred by electrical connections 46 to a transducer, if necessary, and then to a recorder, controller, computer, or any other instrument requiring information from the analyzer.

In FIGURE 3, the assembled apparatus is shown ready for installation and operation. The peak reader apparatus is driven from the analyzer-recorder shaft by gear drive 44. At the time the relay in the analyzer system for the component to be analyzed is turned on, magnetic brake 33 on the apparatus is also turned on. Potentiometer 32 is then driven up scale against the resistance of brake 33 and the spring return by drive disc 43 with drive pin 48 contacting set-screw drive arm 42 and turning potentiometer shaft 45 to the peak value reached by the recorder. It is held at this peak value by magnetic brake 33 since the unilateral drive of the peak reader apparatus does not drive potentiometer shaft 45 down as the recorder goes down scale. When the component relay is turned off, the peak value trapped in the form of an angular shaft position of peak reader potentiometer 32 is transferred to some means of storage via electrical connections 46. For example, in pneumatic storage, an electric current-to-air transducer is connected to potentiometer 32 and storage is effected by controlling a cut-off valve in the transducer output air line. After transferring the peak value, magnetic brake 33 is turned off and the spring returns potentiometer shaft 45 to a zero reading.

As shown in the FIGURES 1 and 2, the peak angular motion is converted to an air signal for pneumatic trend recording and control; however, the peak angular motion can also be used either as an electrical output or the peak can be transferred to a memory type analog computer, stored in a capacitor, or read directly by the analog-to-digital converter of a digital computer. The peak reader apparatus holds the maximum angular rotation of the recorder shaft during the peak and transduces this shaft position into an electrical output signal for transmission. A rotary turning motion to air pressure transducer or a digital encoder of similar dimensions could have a magnetic brake similarly installed and have collars, cams, drive collar and arm, etc., installed on its shaft and could be mounted in place of the potentiometer. It would similarly be driven up scale by the recorder, held by the brake and would transduce the shaft position into an air output signal or into a digital computer signal for transmission as readily as the device shown transmits an electrical signal from its potentiometer. This change would not affect the nature of the invention.

The overall accuracy of the peak reader used with an electric current-to-air-tranducer is dependent on the accuracy of the individual components, i.e., the gear drive from the recorder, linearity of the potentiometer, the transducer, the pneumatic recorder and the loading effect of the transducer on the potentiometer. Precision or ability to repeat, however, is a more important requirement for analytical read-out systems than accuracy. This is particularly true when the read-out system is utilized in a closed-loop control system. The accuracy of the peak reader apparatus of this invention is very good and the ability to repeat is excellent. The ability to repeat is inherent in the basic design of the peak picker since its potentiometer is mechanically driven by the analyzer recorder to the peak reading. After transfer of this peak reading, the potentiometer is reset to zero by spring action and if the recorder again drives to the same position, the peak reader is driven to exactly the same position as for the preceding cycle.

This electro-mechanical peak reader can be used with any type of analytic instrument which analyzes maximums or minimums for component compositions and wherein the component composition can be converted to a proportional rotary motion. Examples of such process analyzers are gas chromatographs, specific gravity analyzers, infrared analyzers, and ultraviolet analyzers. Additionally, the apparatus of this invention may have in combination contacts for separate alarms on as many as four components by providing cams on the mechanical rotation shaft.

Although exemplary embodiments of the invention have been described, it will be understood by those skilled in the art that other applications of the invention are possible and the embodiments described may be subjected to various changes, modifications, and substitutions without departing from the scope of the invention.

What is claimed is:

1. In a signal recording system, the combination of: an analyzer means for determining components of a sample; means for cyclically introducing a sample into said analyzer means, said analyzer means generating upon each introduction of a sample, a series of signal peaks providing a measure of different components in said sample; signal recording means; means for transferring said signal peaks into an unilaterally driven mechanical rotating component; electrical potentiometer means for measuring the position of said unilaterally driven rotating component; quick release brake means for holding the maximum rotational position of said rotating component for a cyclic period; spring means for returning said rotating component to its original position; pneumatic recorder means for receiving said maximum signal peaks; means for sequentially applying said maximum signal peaks to said pneumatic recorder means; programming means for synchronously activating said unilaterally driven mechanical rotating component together with said sample introducing means for applying sequentially to said recorder means selected portions of said signal peaks; and means responsive to said electrical potentiometer means for operating said pneumatic recorder means, whereby said pneumatic recorder means records the maximum values of said component signal peaks.

2. In a signal recording system, the combination of: an analyzer means for determining components of a sample; means for cyclically introducing a sample into said analyzer means, said analyzer means generating upon each introduction of a sample, a series of signal peaks providing a measure of different components in said sample; signal recording means; means for transferring said signal peaks into an unilaterally driven mechanical rotating component; electrical potentiometer means for measuring the position of said unilaterally driven rotating component; magnetic brake means for holding the maximum rotational position of said rotating component for a cyclic period; spring means for returning said rotating component to its original position; pneumatic recorder means for receiving said maximum signal peaks; means for sequentially applying said maximum signal peaks to said pneumatic recorder means; programming means for synchronously activating said unilaterally driven rotating component together with said sample introducing means for applying sequentially to said recorder means selected portions of said signal peaks; and means responsive to said electrical potentiometer means for operating said pneumatic recorder means whereby said pneumatic recorder means records the maximum values of said component signal peaks.

3. In a signal recording system, the combination of: an analyzer means for determining components of a sample; means for cyclically introducing a sample into said analyzer means, said analyzer means generating upon each introduction of a sample, a series of signal peaks recording means; means for transferring said signal peaks into an unilaterally driven mechanical rotating component; electrical potentiometer means for measuring the position of said unilaterally driven rotating component; magnetic brake means for a cyclic period; spring means for returning said rotating component to its original position; pneumatic recorder means for receiving said maximum signal peaks; means for sequentially applying said maximum signal peaks to said pneumatic recorder means; programming means for synchronously activating said unilaterally driven mechanical rotating component together with said sample introducing means for applying sequentially to said recorder means selected portions of said signal peaks; means attached to said unilaterally driven rotating component for activating alarm signal micro-switches; and means responsive to said electrical potentiometer means for operating said pneumatic recorder means, whereby said pneumatic recorder means records the maximum values of said component signal peaks.

4. In a signal recording system, analyzer means for producing in accordance with the cyclical introduction of sample a cyclical train of signal peaks in the form of mechanical cyclical angular motion proportional to the amplitude of said signal peaks, electrical variable resistance means having a source of potential connected thereto whereby voltage signals proportional to the amplitude of said signal peaks are produced, said voltage signals being produced in accordance with the positioning of the movable arm of said variable resistance, unilateral drive means mechanically coupling said cyclical angular motion produced by said analyzer means to said movable arm of said variable resistance to move said movable arm in only one direction, quick release brake means for holding said movable arm of said variable resistance in cyclical stationary positions, programming means for synchronizing the activating and releasing of said brake means with said angular motion produced by said analyzer means so that said brake means is activated during the time said angular motion is produced, control means operated by said programming means for activating and releasing said brake means, spring means for returning said movable arm of the variable resistance to its original position, transducer means responsive to said voltage signal from said variable resistance for converting the same into an output signal, and means for holding said output signal until the same has been recorded.

5. In a trend recorder wherein an analyzer means produces in accordance with cyclical introduction of samples into said analyzer means a cyclical train of signal peaks in the form of mechanical cyclical angular motion proportional to the amplitude of the signal peaks, potentiometer means having a source of potential connected thereto whereby voltage signals proportional to the amplitude of said signal peaks are produced and converted into a signal for recording said voltage signal being produced in accordance with the positioning of the wiper arm of said potentiometer means, unilateral drive means mechanically coupling said cyclical angular motion produced by said analyzer means to said wiper arm of said potentiometer means to move said wiper arm in only one direction, said wiper arm being spring-loaded and the movement of said wiper arm being against the action of said spring, quick release brake means for holding said wiper arm in a stationary position against the action of said spring when no angular motion is applied to said wiper arm, and control means for activating said brake means immediately prior to development of said angular motion and for releasing said brake means after transfer of said angular motion to said recorder to thereby permit said spring to return said wiper arm to its original position.

6. The apparatus of claim 5 wherein said unilateral drive means comprises a circular drive disc rotatably driven on its axis from one side by said analyzer means and having a drive pin projecting from the other side at some location other than the axis of said drive disc and a circular driven disc having a radially extending pin arranged to contact said drive pin projecting from said drive disc, said circular driven disc being mechanically coupled to said wiper arm so that rotation of said drive disc contacts said driven disc through said drive pin and said radially extending pin to rotate said wiper arm in only one direction.

7. The apparatus of claim 5 wherein said quick release control means is an electromagnetic brake means.

8. The apparatus of claim 7 wherein said control means for activation and release of said electromagnetic brake means is an electrical switch means.

References Cited by the Examiner

UNITED STATES PATENTS

| | | | |
|---|---|---|---|
| 2,951,361 | 9/1960 | Fuller | 73—23.1 |
| 3,009,864 | 11/1961 | Webb | 73—23.1 |
| 3,098,957 | 7/1963 | Thompson et al. | 318—19 |

RICHARD C. QUEISSER, *Primary Examiner.*